US012754103B2

(12) United States Patent
Hauptvogel et al.

(10) Patent No.: US 12,754,103 B2
(45) Date of Patent: Oct. 6, 2026

(54) SYSTEM AND METHOD FOR DIAGNOSING A CRANKCASE VENTILATION SYSTEM OF AN INTERNAL COMBUSTION ENGINE

(71) Applicant: Volkswagen Aktiengesellschaft, Wolfsburg (DE)

(72) Inventors: Mathias Hauptvogel, Weferlingen (DE); Stephan Wassmann, Isenbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 275 days.

(21) Appl. No.: 18/642,646

(22) Filed: Apr. 22, 2024

(65) Prior Publication Data

US 2024/0353292 A1 Oct. 24, 2024

(30) Foreign Application Priority Data

Apr. 20, 2023 (DE) ..................... 10 2023 110 102.1

(51) Int. Cl.
*G01M 15/09* (2006.01)
*F01M 13/00* (2006.01)
*F01M 13/02* (2006.01)
*F01M 11/10* (2006.01)

(52) U.S. Cl.
CPC .................................. *G01M 15/09* (2013.01)

(58) Field of Classification Search
CPC .......... G01M 15/09; F01M 2013/0038; F01M 2013/0083; F01M 2013/027; F01M 11/10; F01M 13/02
See application file for complete search history.

(56) References Cited

U.S. PATENT DOCUMENTS 9,127,578 B2 9/2015 Pursifull et al.
9,664,079 B2 5/2017 Jentz et al.
11,220,936 B1 1/2022 Dudar
11,598,295 B1 3/2023 Yamada et al.
(Continued)

FOREIGN PATENT DOCUMENTS

DE 102015116483 A1 4/2016
DE 102016222117 A1 5/2018
(Continued)

*Primary Examiner* — Laura Martin Sweeney
*Assistant Examiner* — Anthony W Megna Fuentes
(74) *Attorney, Agent, or Firm* — Muncy, Geissler, Olds & Lowe, P.C.

(57) ABSTRACT

A system for diagnosing a crankcase ventilation system of an internal combustion engine. The system includes an internal combustion engine with at least one combustion chamber. The combustion chamber is bounded by a cylinder head, a cylinder in an engine block, and a piston. The piston is connected via a connecting rod to a crankshaft, which is disposed in a crankcase. An air supply system feeds fresh air into the combustion chamber of the internal combustion engine. At least one aeration line connects the air supply system to the crankcase. At least one vent line, which is different from the aeration line, connect the crankcase to the air supply system. A pressure sensor is disposed in the crankcase or the aeration line. A method for diagnosing a crankcase ventilation system and a control device for carrying out such a method are also provided.

12 Claims, 3 Drawing Sheets

(56) References Cited

U.S. PATENT DOCUMENTS

| | | | | |
|---|---|---|---|---|
| 12,055,077 | B2 | 8/2024 | Gruenbeck | |
| 2014/0081549 | A1 | 3/2014 | Rollinger et al. | |
| 2014/0081551 | A1* | 3/2014 | Rollinger ............. | F01M 13/021<br>701/101 |
| 2020/0256276 | A1 | 8/2020 | Sekiguchi et al. | |
| 2020/0400050 | A1 | 12/2020 | Jentz et al. | |
| 2021/0348532 | A1* | 11/2021 | Holzeder ............... | F01M 11/10 |

FOREIGN PATENT DOCUMENTS

| | | | | |
|---|---|---|---|---|
| DE | 102017202292 | A1 * | 8/2018 | ............. F01M 13/02 |
| DE | 102019200982 | A1 | 7/2020 | |
| DE | 102019200978 | B4 | 11/2020 | |
| DE | 102022104194 | A1 | 8/2022 | |
| DE | 102022134227 | A1 | 6/2023 | |

* cited by examiner

SYSTEM AND METHOD FOR DIAGNOSING A CRANKCASE VENTILATION SYSTEM OF AN INTERNAL COMBUSTION ENGINE

This nonprovisional application claims priority under 35 U.S.C. § 119(a) to German Patent Application No. 10 2023 110 102.1, which was filed in Germany on Apr. 20, 2023, and which is herein incorporated by reference.

BACKGROUND OF THE INVENTION

Field of the Invention

The invention relates to a system for diagnosing a crankcase ventilation system of an internal combustion engine and to a method for diagnosing a crankcase ventilation system of an internal combustion engine with such a system according to the preamble of the independent claims.

Description of the Background Art

Internal combustion engines have a crankcase in which a crankshaft of the internal combustion engine is disposed. Further, an oil sump is provided in the crankcase for lubricating moving components of the internal combustion engine. Oil vapors may be present in the crankcase due to the evaporating oil. Further, a small amount of gas always escapes from the combustion chamber into the crankcase, as the piston rings do not seal the gap between a combustion engine piston and the cylinder completely and gas-tight. To prevent overpressure in the crankcase, these gases and vapors must be removed from the crankcase. In this regard, the gases and vapors are usually discharged into an air supply system of the internal combustion engine and thus into the combustion chamber in order to avoid uncontrolled environmental emissions caused by these gases and vapors.

The increasing requirements in exhaust gas legislation make it necessary not only for the crankcase ventilation to function continuously, but also for the functioning of the crankcase ventilation system to be monitored as part of on-board diagnostics. One option for monitoring the functioning of the crankcase ventilation system, in particular to identify breaches in the crankcase vent lines, is to detect the pressure in the crankcase. Possible damage to the crankcase ventilation system comprises, for example, damaged or kinked fresh air hoses, unplugged or damaged lines that transport crankcase gases, loosened closure caps in the crankcase that block or expose an aeration opening, a defective seal, or the like. A faulty crankcase ventilation system can also lead to increased wear or damage to engine components in the long term.

Various approaches can be used to monitor the integrity of a crankcase ventilation system. For example, diagnostic blow-by approaches can be used, wherein a pressure sensor, used in the crankcase, and a valve in a PCV fresh air hose are opened and a breach in the system is determined based on resulting changes in crankcase pressure or vacuum. Another exemplary approach, known from US 2014/0081549 A1, relies on a pressure sensor of the crankcase vent tube to detect a separation of the ventilation tube/hose. Still other approaches may use a combination of pressure sensors positioned at different locations in the crankcase ventilation system to monitor the integrity of the crankcase ventilation system.

An internal combustion engine with a crankcase ventilation system is known from DE 10 2015 116 483 A1, which corresponds to US 2016/0097355. In this case, a crankcase sensor is provided to diagnose the position and type of an integrity breach in a crankcase ventilation system. Integrated crankcase vent tube (CVT) pressure readings are used to diagnose a disconnection of the CVT on the air intake side and to distinguish it from a disconnection on the crankcase side.

A system and method for monitoring the integrity of the crankcase ventilation system are known from U.S. Pat. No. 9,127,578 A1. In an exemplary approach, a method comprises indicating a crankcase ventilation system degradation based on a lower vacuum than expected downstream of a PCV breather tube. For example, indication of crankcase ventilation system degradation may be based on a lower vacuum than expected downstream of a PCV breather tube based on an absolute pressure sensor measurement relative to an ambient pressure.

Further, US 2020/0400050 A1 discloses a method and a system for diagnosing a positive crankcase ventilation system. In one exemplary embodiment, a diagnostic method for a positive crankcase ventilation system is presented that comprises determining a fault condition in a positive crankcase ventilation system by comparing a pressure, sampled from a pressure sensor positioned on a clean side of an oil separator and coupled to a crankcase, with a modeled pressure representing an expected pressure on the clean side of the oil separator.

SUMMARY OF THE INVENTION

It is therefore an object of the invention of further improving a diagnosis of the crankcase ventilation system and reliably detecting damage to the crankcase aeration and venting system.

According to an example of the invention, the object is achieved by a system for diagnosing a crankcase ventilation system of an internal combustion engine. The system comprises: an internal combustion engine with at least one combustion chamber, wherein the combustion chamber is bounded by a cylinder head, a cylinder in an engine block, and a piston, wherein the piston is connected via a connecting rod to a crankshaft, which is disposed in a crankcase; an air supply system for feeding fresh air into the combustion chamber of the internal combustion engine; at least one aeration line connecting the air supply system to the crankcase; at least one vent line, which is different from the aeration line and connects the crankcase to the air supply system; and a pressure sensor disposed in the crankcase or the aeration line.

Such a system enables a diagnosis and monitoring of the crankcase ventilation system in a simple and reliable manner.

The internal combustion engine can be designed as an internal combustion engine turbocharged by means of an exhaust gas turbocharger. The exhaust gas turbocharger can build up pressure, which can be used to diagnose the crankcase ventilation system. Further, the exhaust gas turbocharger can create an air flow to flush the crankcase.

The aeration line can branch off from the air supply system downstream of a compressor of the exhaust gas turbocharger, and the pressure sensor can be disposed in or on the aeration line. Because the flow of fresh air into the crankcase only functions to the expected extent if the gas located in the crankcase can flow out at the same time, the volume flow, a pressure value, or a pressure change in the fresh air line can be evaluated in order to assess the functioning of the crankcase ventilation system.

A throttle can be disposed in the aeration line upstream of the pressure sensor. The amount of air flowing into the crankcase can be limited by a throttle in the fresh air line. As a result, a vacuum can be generated in the crankcase, which indicates a proper functioning of the crankcase ventilation system. In this context, a throttle is understood to be a flow restriction in the line that reduces the maximum volume flow through the line. Such a throttle can be designed in particular as a constriction in the aeration line, as a throttle with or without an adjustable line cross section, a throttle bore, or a flow-limiting opening cross section of a check valve.

A Venturi nozzle can be disposed in the vent line. A Venturi nozzle in the vent line can be used to create a vacuum in the crankcase in a simple and cost-effective manner. This vacuum or the change in this vacuum can be used to diagnose the crankcase ventilation system, because the vacuum only occurs to the expected extent when the crankcase ventilation is functioning properly.

The Venturi nozzle can be part of a suction jet pump which conveys the gas from the crankcase into an intake line of the air supply system. A suction jet pump is a simple and inexpensive way of extracting the gas from the crankcase and creating a vacuum in the crankcase. In this regard, the fresh air flowing into the crankcase can be used as propellant gas for the suction jet pump, so that more gas is extracted from the crankcase by the suction jet pump with an increasing boost pressure and increasing fresh air volume.

The vent line can run through a suction jet pump such that a motive flow generated by the turbocharger compressor can be used to generate a vacuum and thus to generate an air flow through the vent line. A suction jet pump is a simple and cost-effective way of extracting the gas from the crankcase and creating or increasing a vacuum in the crankcase.

A second vent line can be provided, which connects an intake path of the compressor of the exhaust gas turbocharger or the intake manifold to the crankcase. A second aeration line offers the advantage that the pressure changes in the second aeration line are not influenced or disturbed by the suction jet pump. Therefore, a pressure change in the second aeration line is easier and more reliable to evaluate than a pressure change in the first aeration line.

A further aspect of the invention relates to a method for diagnosing a crankcase ventilation system of an internal combustion engine with a system described in the preceding sections for diagnosing a crankcase ventilation system of an internal combustion engine, a method which comprises the following steps: operating the internal combustion engine at an operating point at which a boost pressure is built up by the compressor of the exhaust gas turbocharger, evaluating a change in the pressure in the crankcase or in the aeration line downstream of a throttle in response to the boost pressure build-up.

The method described enables a precise and reliable diagnosis of the functioning of the crankcase ventilation system of an internal combustion engine. In this diagnostic strategy, a boost pressure is generated during a transition from a suction operation of the internal combustion engine to a turbocharged operation; this boost pressure leads to a change in the pressure in the crankcase or in the aeration line downstream of the throttle. In this regard, a pressure control valve opens to regulate the vacuum in the crankcase, causing the pressure in the crankcase to rise. When the boost pressure is sufficient, the pressure control valve closes again, as there is again sufficient vacuum in the crankcase. This vacuum is generated by a Venturi effect in the intake line upstream of the compressor of the exhaust gas turbocharger. If the crankcase vent line is defective, the pressure level in the crankcase cannot be regulated by the pressure control valve, or only insufficiently, as there is no pressure difference between the crankcase and the ventilation area. If the crankcase ventilation system is defective, no sufficient vacuum can be built up in the crankcase during the boost pressure build-up, so that the pressure change in the crankcase does not follow the pressure change in the boost pressure value. In this case, a fault or defect in the crankcase ventilation system can be concluded.

In an example of the method, it is provided that during the boost pressure build-up, starting from a substantially constant vacuum in the crankcase, an increase in the pressure in the crankcase or in the aeration line downstream of the throttle and a drop in the pressure, following the increase in pressure, in the crankcase or in the aeration line downstream of the throttle are evaluated for the purpose of diagnosing the crankcase ventilation system. If the crankcase ventilation system is in order, the pressure in the crankcase or the aeration line downstream of the throttle thus initially increases as the boost pressure builds up, so that the vacuum in the crankcase decreases. As a result of this reduced vacuum, the volume flow through the vent line increases, as a result of which the pressure in the crankcase and in the aeration line downstream of the throttle drops again and the vacuum in the crankcase increases. In the case of a defective crankcase ventilation system, the pressure in the crankcase and in the aeration line downstream of the throttle also increases as a result of the boost pressure build-up, but there is no or a delayed or a reduced renewed build-up of a vacuum in the crankcase. The functioning of the crankcase ventilation system can therefore be deduced from the change in pressure in the crankcase or in the aeration line downstream of the throttle as a result of a build-up in boost pressure.

It is preferable for the crankcase ventilation system to be diagnosed when the build-up of the boost pressure by the compressor exceeds a certain threshold value, for example, a boost pressure build-up of at least 0.5 bar boost pressure. Such a threshold value ensures that the diagnosis only takes place when there is a sufficient pressure change in the intake manifold downstream of the compressor of the exhaust gas turbocharger, so that there is a sufficiently large pressure change in the boost pressure in order to evaluate a pressure change, following this boost pressure build-up, in the crankcase or in the aeration line downstream of the throttle.

In the event of a boost pressure build-up above a threshold value, in particular with a boost pressure build-up of at least 0.5 bar boost pressure, a pressure maximum and a subsequent pressure minimum can be determined in the crankcase or in the aeration line downstream of the throttle, starting from a substantially constant vacuum in the crankcase. A functioning of the crankcase ventilation system can be deduced from the pressure difference between the pressure maximum and the pressure minimum. As described in the previous section, an increase in boost pressure initially leads to an increase in pressure in the crankcase, so that a pressure maximum is reached. As a result of the pressure increase in the crankcase, more crankcase gas flows through the vent line, so that the pressure in the crankcase is reduced again. In this case, a pressure minimum is reached. If the pressure difference between the pressure maximum and pressure minimum is above a threshold value, it can be concluded that the crankcase ventilation system is functioning properly. If the pressure difference is below such a threshold value, it can be concluded that there is a malfunction or defect in the crankcase ventilation system.

A suction jet pump, with which a vacuum is generated in the crankcase, can be disposed in the vent line, wherein a functioning of the crankcase ventilation system is deduced from a decrease in pressure in the crankcase. The vacuum in the crankcase can be increased by the suction jet pump, as a result of which the evaluation of the change in pressure in the crankcase as a response to a boost pressure build-up can be assessed more easily and reliably.

A volume flow through the aeration line can be additionally evaluated during a boost pressure build-up and a functioning of the crankcase ventilation system is deduced from the volume flow. Depending on the boost pressure build-up, a volume flow into the crankcase is to be expected in order to at least partially compensate for the vacuum in the crankcase. The maximum amount of fresh air flowing into the crankcase can be limited by a throttle in the aeration line. The volume flow can be compared with an expected volume flow and, in the event of a deviation, a flow or damage to the crankcase ventilation system can be concluded.

A gas flow of blow-by gases, which flow into the crankcase between the piston and the cylinder in the engine block, can be determined or estimated additionally, wherein the gas flow of the blow-by gases is taken into account when evaluating the pressure change in the crankcase. In addition to the fresh air flowing into the crankcase via the aeration line, blow-by gases also additionally enter the crankcase from the combustion chamber, as a gas-tight seal between the piston and cylinder by the piston rings is neither possible nor desirable. Therefore, to improve the result, the amount of blow-by gases can also be estimated and taken into account when determining an expected pressure in the crankcase.

A further aspect of the invention relates to a control device with a memory unit and a computing unit, wherein a computer program code is stored in the memory unit, which code, when executed by the computing unit, executes such a method for diagnosing a crankcase ventilation system of an internal combustion engine.

The various examples of the invention mentioned in this application can be advantageously combined with one another.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
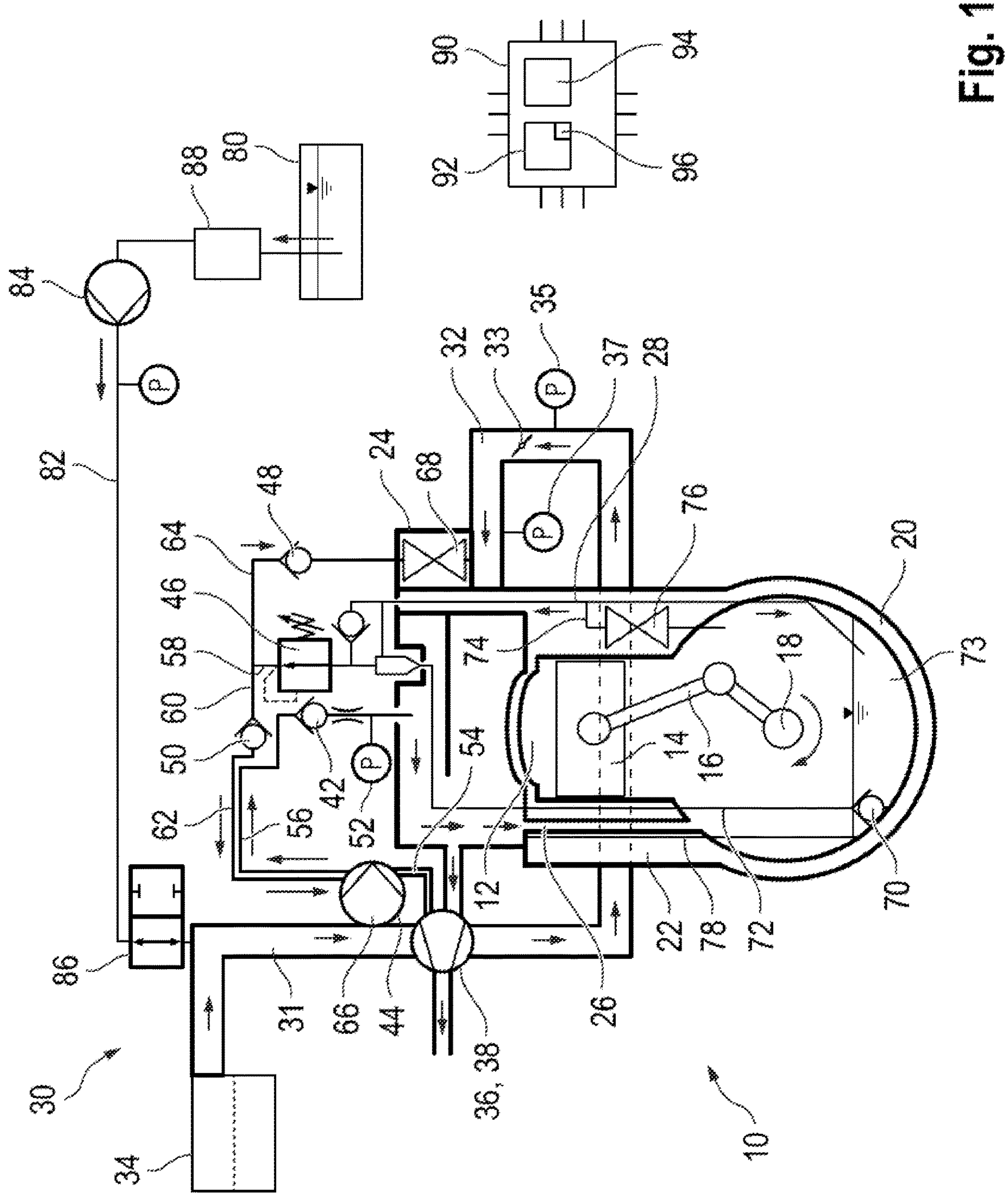
FIG. 1 shows an example for an internal combustion engine for carrying out a method of the invention for diagnosing a crankcase ventilation system of the internal combustion engine.

An example of an internal combustion engine 10 for carrying out a method of the invention for diagnosing a crankcase ventilation system of the internal combustion engine 10 is shown in FIG. 1. Internal combustion engine 10 has an engine block 22 and a cylinder head 24. Internal combustion engine 10 further has at least one combustion chamber 12, which is bounded by cylinder head 24, engine block 22, and a piston 14. Preferably, internal combustion engine 10 has a plurality of combustion chambers 12. Piston 14 is connected via a connecting rod 16 to a crankshaft 18, which converts an oscillating movement of piston 14 into a rotary movement. Crankshaft 18 is surrounded by a crankcase 20, which is connected to engine block 22 of internal combustion engine 10.

Internal combustion engine 10 is connected on the intake side to an air supply system 30, via which fresh air can be supplied to combustion chamber 12 of internal combustion engine 10. Air supply system 30 comprises an air filter 34 for filtering the intake air. Air supply system 30 further comprises an intake line 31, which connects air filter 34 to a compressor 36 of an exhaust gas turbocharger 38. Compressor 36 of exhaust gas turbocharger 38 is connected to an inlet of internal combustion engine 10 via an intake manifold 32. A throttle valve 33 is disposed in intake manifold 32 to control the amount of air supplied to combustion chamber 12. Downstream of compressor 36 of exhaust gas turbocharger 38 and upstream of throttle valve 33, a boost pressure sensor 35 is disposed in intake manifold 32 to detect a boost pressure of exhaust gas turbocharger 38. Downstream of the throttle valve and upstream of the inlet of internal combustion engine 10, an intake manifold pressure sensor 37 is disposed in the intake manifold. When throttle valve 33 is fully open, the intake manifold pressure essentially corresponds to the boost pressure of exhaust gas turbocharger 38.

Internal combustion engine 10 is connected further to an exhaust system via its outlet, wherein a turbine 39 of exhaust gas turbocharger 38 is disposed in the exhaust system, through which an exhaust gas stream of internal combustion engine 10 flows and which drives compressor 36 of exhaust gas turbocharger 38.

An aeration duct 26 is formed in engine block 22, which duct establishes a fluidic connection between a first region of cylinder head 24 and crankcase 20. Further, a vent duct 28 is formed in engine block 22, which duct fluidically connects crankcase 20 to a second region of cylinder head 24. Provided in crankcase 20 is an oil return 70 via which oil can flow back into an oil pan 73. Further, a first oil separator 72 is disposed in crankcase 20 to prevent oil mist from entering aeration duct 26. In addition, a second oil separator 74 is provided in crankcase 20, which prevents oil mist from entering vent duct 28. In addition, an oil return 78 is formed in engine block 22 to enable oil to flow back into oil pan 73.

A first flow path is provided for venting crankcase 20, via which path fresh air compressed by compressor 36 of exhaust gas turbocharger 38 can be introduced into crankcase 20 via a purge line 54, an aeration line 56 in cylinder head 24, and aeration duct 26. A check valve 42 is disposed in aeration line 56 to prevent the uncontrolled escape of air from crankcase 20. Further, a throttle 40 can be disposed in aeration line 56 in order to limit the amount of fresh air supplied to crankcase 20. Further, a pressure sensor 52 is disposed in aeration line 56, with which a pressure in aeration line 56 can be detected. Due to the fluidic connection between the aeration line and crankcase 20, a functioning of the crankcase ventilation system can be deduced from the pressure change in aeration line 56.

In order to remove the air from crankcase 20, a second flow path is provided via which the air from crankcase 20 can be fed to air supply system 30 via vent duct 28 and a vent line 58 in cylinder head 24 of internal combustion engine 10. A pressure control valve 46 is disposed in vent line 58. Vent line 58 has a branch 60 downstream of pressure control valve 46, at which branch vent line 58 splits into a first section 62, which is connected to intake line 31 of the internal combustion engine via a suction jet pump 44, and into a second section 64, which is connected to intake manifold 32 of air supply system 30. In this case, a check valve 50 is disposed in first section 62, which prevents fresh air from flowing from intake line 31 into vent line 58. First section 62 opens into intake line 31 of air supply system 30 at an inlet 66, which is located downstream of air filter 34 and upstream of compressor 36 of exhaust gas turbocharger 38. Further, a check valve 48 is disposed in second section 64, which valve prevents fresh air from flowing from intake manifold 32 into vent line 58. Second section 64 opens into intake manifold 32 of air supply system 30 at a second inlet 68 downstream of throttle valve 33. In this regard, a vent line 58 that has fallen off or is defective has the effect that no or only a small amount of gases can be transported from crankcase 20 in the direction of inlet 66 into intake line 31. As a result, when the boost pressure of exhaust gas turbocharger 38 builds up, no fresh air or a less than expected amount of fresh air would flow into crankcase 20 via aeration line 56 and aeration duct 26. Thus, the evaluation of a volume flow through aeration line 56 can be used to diagnose the functioning of the crankcase ventilation system. Further, a lower negative pressure than expected would occur in aeration line 56 downstream of throttle 40, so that the pressure measured at sensor 52 or a pressure change as a result of a pressure change in intake manifold 32 due to a build-up of boost pressure can also be used to diagnose the functioning of the crankcase ventilation system.

Further, an additional aeration line can be provided which connects air supply system 30, in particular intake manifold 32 or another section of air supply system 30 downstream of compressor 36 of exhaust gas turbocharger 38, directly, that is to say, without an intermediate suction jet pump 44, to crankcase 20. Such an additional aeration line is favorable because the pressure change in this additional aeration line is not influenced by the negative pressure generation in suction jet pump 44.

Internal combustion engine 10 is further operatively connected to a fuel supply system. To prevent an uncontrolled escape of fuel vapors from fuel tank 80, an activated carbon filter 88 is provided in which these fuel vapors are captured and bound. Activated carbon filter 88 is connected to intake line 31 of air supply system 30 via a tank vent line 82. To regenerate activated carbon filter 88, a purge air pump 84 is provided, which is disposed in tank vent line 82. Further, a tank vent valve 86 is provided in tank vent line 82 to control the release of the fuel vapor into intake line 31.

Internal combustion engine 10 is operatively connected to a control device 90, which has a memory unit 92 and a computing unit 94. A computer program code 96 is stored in memory unit 92, which code carries out a method of the invention for diagnosing a crankcase ventilation system when computer program code 96 is executed by computing unit 94 of control device 90.

Figure 2:
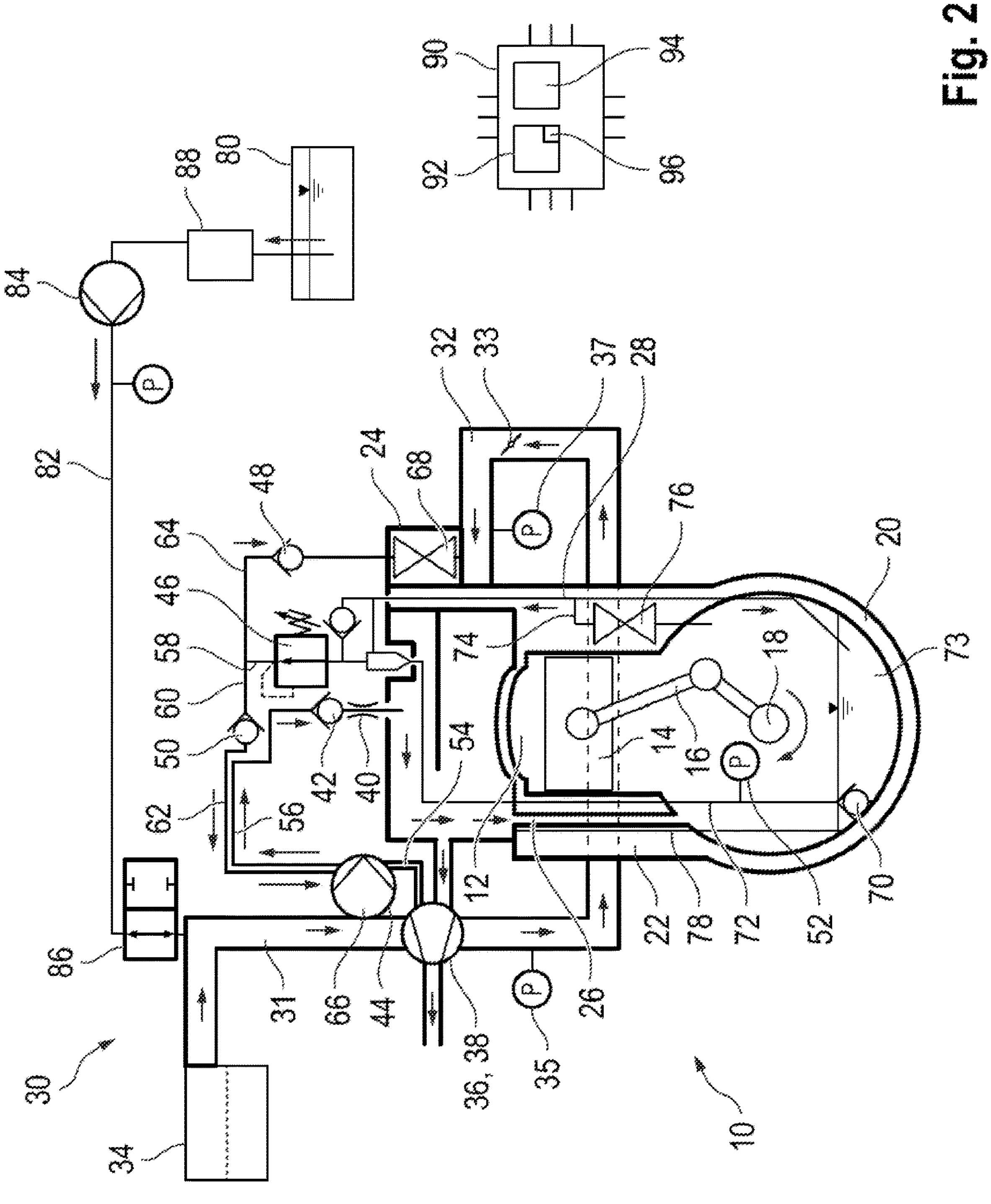
FIG. 2 shows an example for an internal combustion engine for carrying out a method of the invention for diagnosing a crankcase ventilation system of the internal combustion engine.

A further example of an internal combustion engine 10 for carrying out a method of the invention for diagnosing a crankcase ventilation system of internal combustion engine 10 is shown in FIG. 2. Internal combustion engine 10 has an engine block 22 and a cylinder head 24. Internal combustion engine 10 further has at least one combustion chamber 12, which is bounded by cylinder head 24, engine block 22, and a piston 14. Preferably, internal combustion engine 10 has a plurality of combustion chambers 12. Piston 14 is connected via a connecting rod 16 to a crankshaft 18, which converts an oscillating movement of piston 14 into a rotary movement. Crankshaft 18 is surrounded by a crankcase 20, which is connected to engine block 22 of internal combustion engine 10.

Internal combustion engine 10 is connected on the intake side to an air supply system 30, via which fresh air can be supplied to combustion chamber 12 of internal combustion engine 10. Air supply system 30 comprises an air filter 34 for filtering the intake air. Air supply system 30 further comprises an intake line 31, which connects air filter 34 to a compressor 36 of an exhaust gas turbocharger 38. Compressor 36 of exhaust gas turbocharger is connected to an inlet of internal combustion engine 10 via an intake manifold 32. A throttle valve 33 is disposed in intake manifold 32 to control the amount of air supplied to combustion chamber 12. Downstream of compressor 36 of exhaust gas turbocharger 38 and upstream of throttle valve 33, a boost pressure sensor 35 is disposed in intake manifold 32 to detect a boost pressure of exhaust gas turbocharger 38. Downstream of the throttle valve and upstream of the inlet of internal combustion engine 10, an intake manifold pressure sensor 37 is disposed in the intake manifold. When throttle valve 33 is fully open, the intake manifold pressure essentially corresponds to the boost pressure of exhaust gas turbocharger 38.

Internal combustion engine 10 is connected further to an exhaust system via its outlet, wherein a turbine 39 of exhaust gas turbocharger 38 is disposed in the exhaust system, through which an exhaust gas stream of internal combustion engine 10 flows and which drives compressor 36 of exhaust gas turbocharger 38.

An aeration duct 26 is formed in engine block 22, which duct establishes a fluidic connection between a first region of cylinder head 24 and crankcase 20. Further, a vent duct 28 is formed in engine block 22, which duct fluidically connects crankcase 20 to a second region of cylinder head 24. Provided in crankcase 20 is an oil return 70 via which oil can flow back into an oil pan 73. Further, a first oil separator 72 is disposed in crankcase 20 to prevent oil mist from entering aeration duct 26. In addition, a second oil separator 74 is provided in crankcase 20, which prevents oil mist from entering vent duct 28. In addition, an oil return 78 is formed in engine block 22 to enable oil to flow back into oil pan 73.

A first flow path is provided for venting crankcase 20, via which path fresh air compressed by compressor 36 of exhaust gas turbocharger 38 can be introduced into crankcase 20 via a purge line 54, an aeration line 56 in cylinder head 24, and aeration duct 26. A check valve 42 is disposed in aeration line 56 to prevent the uncontrolled escape of air from crankcase 20. Further, a throttle 40 can be disposed in aeration line 56 in order to limit the amount of fresh air supplied to crankcase 20.

In order to remove the air from crankcase 20, a second flow path is provided via which the air from crankcase 20 can be fed to air supply system 30 via vent duct 28 and a vent line 58 in cylinder head 24 of internal combustion engine 10. A pressure control valve 46 is disposed in vent line 58. Vent line 58 has a branch 60 downstream of pressure control valve 46, at which branch vent line 58 splits into a first section 62, which is connected to intake line 31 of the internal combustion engine via a suction jet pump 44, and into a second section 64, which is connected to intake manifold 32 of air supply system 30. In this case, a check valve 50 is disposed in first section 62, which prevents fresh air from flowing from intake line 31 into vent line 58. First section 62 opens into intake line 31 of air supply system 30 at a first inlet 66, which is located downstream of air filter 34 and upstream of compressor 36 of exhaust gas turbocharger 38. Further, a check valve 48 is disposed in second section 64, which valve prevents fresh air from flowing from intake manifold 32 into vent line 58. Second section 64 opens into intake manifold 32 of air supply system 30 at a second inlet 68 downstream of throttle valve 33. A pressure sensor 52 is disposed in crankcase 20, which detects a pressure in crankcase 20. In this regard, a functioning of crankcase ventilation system can be deduced from a change in the pressure in air supply system 30 and a resulting change in the pressure in crankcase 20.

A vent line 58 that has fallen off or is defective would transport no or only a small amount of gas from crankcase 20 in the direction of inlet 66 into intake line 31. As a result, when the boost pressure of exhaust gas turbocharger 38 builds up in crankcase 20, a vacuum or a lower than expected vacuum would not be created as desired. Suction jet pump 44 can support or increase the formation of negative pressure in crankcase 20, which improves the crankcase ventilation.

Internal combustion engine 10 is further operatively connected to a fuel supply system. To prevent an uncontrolled escape of fuel vapors from fuel tank 80, an activated carbon filter 88 is provided in which these fuel vapors are captured and bound. Activated carbon filter 88 is connected to intake line 31 of air supply system 30 via a tank vent line 82. To regenerate activated carbon filter 88, a purge air pump 84 is provided, which is disposed in tank vent line 82. Further, a tank vent valve 86 is provided in tank vent line 82 to control the release of the fuel vapor into intake line 31.

Internal combustion engine 10 is operatively connected to a control device 90, which has a memory unit 92 and a computing unit 94. A computer program code 96 is stored in memory unit 92, which code carries out a method of the invention for diagnosing a crankcase ventilation system when computer program code 96 is executed by computing unit 94 of control device 90.

Figure 3:
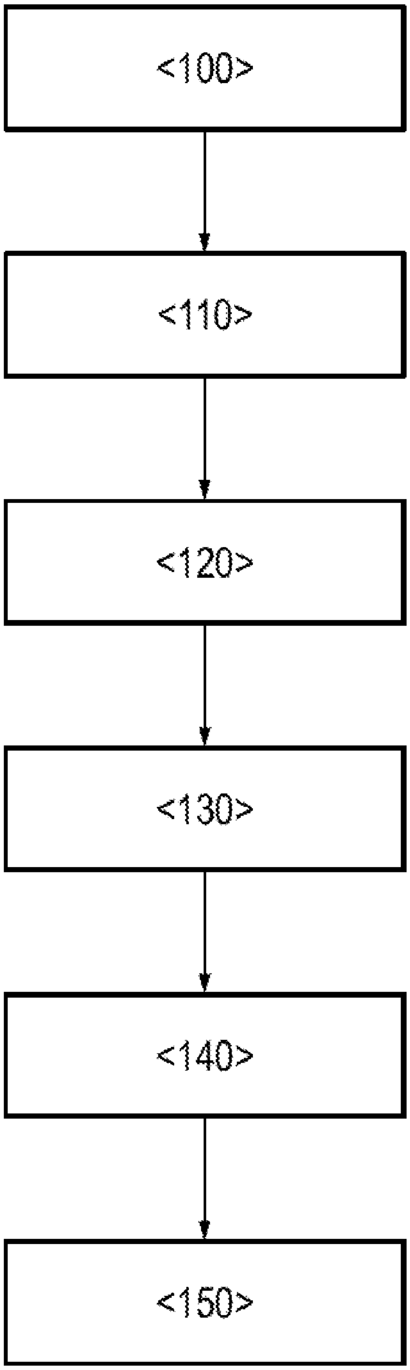
FIG. 3 shows a flowchart for carrying out a method of the invention for diagnosing a crankcase ventilation system of an internal combustion engine.

FIG. 3 shows a flowchart for carrying out a method of the invention for diagnosing a crankcase ventilation system of an internal combustion engine 10. In a first method step <100>, a temporal change in the pressure $\Delta p_{KS}$ in crankcase 20 or a component 22, 24, 26, 28 fluidically connected to crankcase 20 is detected. Further, in a method step <110>, a pressure change $\Delta p_{REF}$ of a reference pressure is detected or an expected change over time $\Delta p_{KSM}$ is modeled for a pressure change in crankcase 20. In a method step <120>, a gradient is formed from the pressure change over time $\Delta p_{KS}$ of the pressure in the crankcase and the pressure change $\Delta p_{REF}$ of the reference pressure or the expected pressure change $\Delta p_{KSM}$ in crankcase 20. This gradient is integrated over time in a method step <130>. In a method step <140>, the value obtained by the integration is compared with a threshold value, wherein, if the threshold value is exceeded, in a method step <150>, a fault or defect in the crankcase ventilation system is concluded.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What claimed is:

1. A system to diagnose a crankcase ventilation system of an internal combustion engine, the system comprising: an internal combustion engine with at least one combustion chamber, wherein the combustion chamber is bounded by a cylinder head, a cylinder in an engine block, and a piston, wherein the piston is connected via a connecting rod to a crankshaft, which is disposed in a crankcase; an air supply system for feeding fresh air into the combustion chamber of the internal combustion engine; at least one aeration line connecting the air supply system to the crankcase; at least one vent line, which is different from the at least one aeration line and connects the crankcase to the air supply system; and a pressure sensor disposed in the at least one aeration line, wherein the internal combustion engine is designed as an internal combustion engine turbocharged via an exhaust gas turbocharger, wherein the at least one aeration line branches off from the air supply system upstream of a compressor of the exhaust gas turbocharger, and wherein a throttle is disposed in the at least one aeration line upstream of the pressure sensor.

2. The system for diagnosing a crankcase ventilation system of an internal combustion engine according to claim 1, further comprising a Venturi nozzle disposed in the at least one vent line.

3. The system for diagnosing a crankcase ventilation system of an internal combustion engine according to claim 2, wherein the Venturi nozzle is part of a suction jet pump that conveys gas from the crankcase into an intake line of the air supply system.

4. The system for diagnosing a crankcase ventilation system of an internal combustion engine according to claim 3, wherein the at least one vent line runs through the suction jet pump such that a motive flow generated by the compressor of the exhaust gas turbocharger is used to generate a vacuum and thus to generate an air flow through the at least one vent line.

5. The system for diagnosing a crankcase ventilation of an internal combustion engine according to claim 4, further comprising a second vent line that connects an intake path of the compressor of the exhaust gas turbocharger or an intake manifold to the crankcase.

6. A method for diagnosing a crankcase ventilation system of an internal combustion engine comprising the system for diagnosis according to claim 1, the method comprising: operating the internal combustion engine at an operating point at which a boost pressure is built up by the compressor of the exhaust gas turbocharger; and evaluating a change in a pressure in the at least one aeration line downstream of the throttle in response to the boost pressure build-up.

7. The method for diagnosing a crankcase ventilation system of an internal combustion engine according to claim 6, wherein, during the boost pressure build-up, starting from a substantially constant vacuum in the crankcase, an increase in the pressure in the at least one aeration line downstream of the throttle and a drop in the pressure, following the increase in pressure, in the at least one aeration line downstream of the throttle are evaluated for the purpose of diagnosing the crankcase ventilation system.

8. The method for diagnosing a crankcase ventilation system of an internal combustion engine according to claim 7, wherein a pressure change in the at least one aeration line is evaluated as a function of the pressure build-up in an intake manifold during the boost pressure build-up of the exhaust gas turbocharger.

9. The method for diagnosing a crankcase ventilation system of an internal combustion engine according to claim 6, wherein a Venturi nozzle, with which a vacuum is generated in the crankcase, is disposed in the at least one vent line, and wherein a functioning of the crankcase ventilation system is determined from a decrease in pressure in the crankcase.

10. The method for diagnosing a crankcase ventilation system of an internal combustion engine according to claim 6, wherein a volume flow through the at least one aeration line is evaluated during the boost pressure build-up and a functioning of the crankcase ventilation system is determined from the volume flow.

11. A control device comprising a memory unit and a computing unit, wherein a computer program code is stored in the memory unit, which code, when executed by the computing unit, executes the method according to claim 6.

12. A method for diagnosing a crankcase ventilation system of an internal combustion engine comprising a system for diagnosis, the system comprising an internal combustion engine with at least one combustion chamber and being designed as an internal combustion engine turbocharged via an exhaust gas turbocharger, the combustion chamber being bounded by a cylinder head, a cylinder in an engine block, and a piston that is connected via a connecting rod to a crankshaft that is disposed in a crankcase; an air supply system for feeding fresh air into the combustion chamber of the internal combustion engine; at least one aeration line connecting the air supply system to the crankcase; at least one vent line, which is different from the at least one aeration line and connects the crankcase to the air supply system; and a pressure sensor disposed in the crankcase or the at least one aeration line, the method comprising:

operating the internal combustion engine at an operating point at which a boost pressure is built up by a compressor of the exhaust gas turbocharger; and evaluating a change in a pressure in the crankcase or in the at least one aeration line downstream of a throttle in response to the boost pressure build-up, wherein, when the boost pressure builds up above a threshold value, starting from a substantially constant vacuum in the crankcase, a pressure maximum and a subsequent pressure minimum of the pressure in the crankcase or in the at least one aeration line downstream of the throttle are determined and a functioning of the crankcase ventilation system is deduced from the pressure difference between the maximum pressure and the minimum pressure.

* * * * *